United States Patent Office 3,294,634
Patented Dec. 27, 1966

3,294,634
FUMIGATION WITH PERFLUORODIMETHYL-PEROXIDE
Everett E. Gilbert, Morristown, N.J., assignor to Allied Chemical Corporation, New York, N.Y., a corporation of New York
No Drawing. Filed Sept. 23, 1965, Ser. No. 489,731
2 Claims. (Cl. 167—39)

This invention is directed to the use of perfluorodimethylperoxide as a fumigant and, more particularly, to a process for the control of pest organisms by subjecting the pests to the vapor of perfluorodimethylperoxide.

As is known in the art, the control of pest organisms which infest hosts such as soil, grain, fruits, vegetables, textiles, dwellings, warehouses and the like is extremely difficult in those cases where the pest organisms penetrate deeply into the interior of the host space. The use of surface poisons or pesticides for this purpose is not completely effective because of the difficulty in reaching the interior of the space. Although various fumigants have been proposed for controlling such pests, there is a need for new and highly effective fumigants.

I have now discovered that perfluorodimethylperoxide is an outstanding fumigant exerting lethal effects, even in extremely small doses, against common penetrating pests such as those infesting plants, plant parts, grain, flour, carpets, etc.

Perfluorodimethylperoxide is a colorless gas boiling at $-37°$ C. and thermally stable up to $225°$ C. It can be synthesized by more than one procedure. However, the preferred procedure appears to be the reaction of carbon monoxide with elemental fluorine or (which may be equivalent thereto) the reaction of trifluoromethyl hypofluorite with fluorophosgene.

In the process of the invention, the pests are subjected to an atmosphere comprising a lethal concentration of perfluorodimethylperoxide. This involves contacting the pests with the vapor of perfluorodimethylperoxide in the enclosure in which the pests live.

The process of this invention is particularly applicable to combatting pest infestation in flour, grain and other stored products, whether contained in storage bins, grain elevators and the like, and to combatting plant pests. The process is also effective for control of other pests such as flies, rice weevils and termites.

The pests are subjected to a toxic concentration of perfluorodimethylperoxide according to well established methods known to the art. According to a typical method, the toxicant is introduced into the enclosure in which the pests exist in such a manner that it is free to diffuse and permeate the atmosphere.

In general, a dosage of at least about 0.02 to 0.4 pound of the toxicant per thousand cubic feet of enclosed space is needed to permeate the area and to insure effective control of the pests. The exposure time required depends upon the size of the enclosed area and the type of host, e.g. flour or grain, in the area. In an area of 1,000 cubic feet, the time generally required for most effective fumigation is from about 8 to about 24 hours. In larger areas, such as grain elevators, desirable fumigation times may be about 24 to 36 hours.

In treating grain or flour, the toxicant is normally simply released over the grain or flour where it is contained in the enclosure, such as storage warehouses, bins, elevators and the like, and allowed to remain in the enclosed space until it has diffused and permeated it. Since the vapor is heavier than air, it tends to sink to the bottom of the enclosure and penetrate the grain or flour as it settles, killing the pest organisms.

The effectiveness of perfluorodimethylperoxide as a fumigant is illustrated by the tests and results described in the following examples:

*Example I*

Test insects were placed in 1.5 inch diameter salve tins with perforated lids. A small amount of appropriate food (grain, flour, ground dog food, etc.) was placed in each tin. Gaseous dosages in the amounts indicated were placed in ampoules and were broken in two-gallon mason jars. As soon as insect containers and compounds were introduced, the jars were sealed. After 24 hours exposure, insect containers were removed and mortality counts made immediately and at 1 day intervals for about 1 week. Follow-up tests were run in the same way using reduced dosages. The test results were as follows:

INITIAL OR SCREENING TEST

| | Percent 5-day Mortality | | | | |
|---|---|---|---|---|---|
| 0.1 cc. $F_3$—O—O—$CF_3$ per. Gal. of Encl. Space | Confused Flour Beetle | Lesser Meal Worm | Black Carpet Bettle | Yellow Meal Worm | House-fly Pupae |
| | 100 | 100 | 100 | 100 | 100 |

FOLLOW-UP TESTS

| Gm. of Compound per Gal. of Encl. Space | Equiv. dosage in lb./ 1,000 ft.³ | Days After Exposure Before Kill Reading | Percent Kill | | | |
|---|---|---|---|---|---|---|
| | | | Confused Flour Beetle | Lesser Meal Worm | Black Carpet Beetle | Yellow Meal Worm |
| 0.025 | 0.411 | 3 | 100 | 100 | 100 | 100 |
| 0.0175 | 0.288 | 3 | 100 | 100 | 100 | 100 |
| 0.00625 | 0.103 | 3 | 100 | 100 | 100 | ¹0 |
| 0.003 | 0.049 | 7 | 100 | 100 | 100 | ¹70 |
| 0.0015 | 0.025 | 7 | 100 | 100 | 100 | ¹40 |
| ²0.00625 | 0.103 | 3 | 80 | 100 | 0 | 80 |
| ²0.003 | 0.049 | 7 | 0 | ¹70 | 0 | 0 |
| ²0.0015 | 0.025 | 7 | 0 | 50 | 0 | 0 |

¹ All remaining insects near dead.
² 1,1-dichloronitroethane (a commercial fumigant known as "Ethide") used in this test in order to provide data for effectiveness comparison.

*Example II*

A test was also conducted against termites. The procedure and results are set forth below.

A salve tin with a perforated lid containing termite workers and a moistened paper towel strip was placed on the floor of a gallon jar and covered with a single thickness of paper toweling before burying under 4" of moist sandy soil. The dosage used was 0.025 gram per gal. of enclosed space (0.411 lb./1000 ft.³). After 24 hours exposure, 100% kill was observed.

Example III

Using the same test procedure described in Example I, the results against rice weevils were as follows:

| Gm. of Compound per Gal. of Encl. Space | Equivalent dosage in lb./1,000 ft.³ | Days After Exposure Before Kill Reading | Percent Mortality |
|---|---|---|---|
| 0.003 | 0.049 | 0 | 100 |
| 0.0015 | 0.025 | 0 | 100 |
| ¹ 0.003 | 0.049 | 0 | 94 |
| ¹ 0.003 | 0.049 | 2 | 94 |
| ¹ 0.003 | 0.049 | 7 | 100 |
| ¹ 0.0015 | 0.025 | 0 | 20 |
| ¹ 0.0015 | 0.025 | 2 | 60 |
| ¹ 0.0015 | 0.025 | 7 | 100 |

¹ 1,1-dichloronitroethane (a commerical fumigant known as "Ethide") used in this test in order to provide data for effectiveness comparison.

Perfluorodimethylperoxide thus has been found to be an exceptionally effective fumigant at very small dosages.

While the invention has been described with particular reference to specific embodiments, it is to be understood that it is not to be limited thereto but is to be construed broadly and restricted solely by the scope of the appended claims.

I claim:

1. A process for the control of pest organisms infesting an enclosed space which comprises subjecting said organisms to an atmosphere comprising a lethal concentration of perfluorodimethylperoxide.

2. The process of claim 1 wherein the perfluorodimethylperoxide is employed in concentration of at least about 0.02 to 0.4 pound per thousand cubic feet of enclosed space.

References Cited by the Examiner

UNITED STATES PATENTS

| | | | |
|---|---|---|---|
| 3,069,404 | 12/1962 | Darby et al. | 260—92.1 |
| 3,100,803 | 8/1963 | Porter et al. | 260—610 |
| 3,179,702 | 4/1965 | Porter et al. | 261—610 |
| 3,230,263 | 1/1966 | Porter et al. | 260—610 |
| 3,230,264 | 1/1966 | Porter et al. | 261—610 |

OTHER REFERENCES

Porter et al.: J. Am. Chem. Soc. 79: 5625–5631 (1937).

LEWIS GOTTS, *Primary Examiner.*

S. K. ROSE, *Assistant Examiner.*